(12) United States Patent
Culverwell

(10) Patent No.: US 6,681,870 B1
(45) Date of Patent: Jan. 27, 2004

(54) HYDRAULIC ACTUATOR

(75) Inventor: Gregory Adrian Culverwell, Rynfeld (ZA)

(73) Assignee: Sulzer South Africa Limited, Elandsfontein (ZA)

( * ) Notice: Subject to any disclaimer, the term of this patent is extended or adjusted under 35 U.S.C. 154(b) by 0 days.

(21) Appl. No.: 09/869,216

(22) PCT Filed: Dec. 15, 1999

(86) PCT No.: PCT/IB99/02005

§ 371 (c)(1), (2), (4) Date: Aug. 30, 2001

(87) PCT Pub. No.: WO00/39468

PCT Pub. Date: Jul. 6, 2000

(30) Foreign Application Priority Data

Dec. 23, 1998 (ZA) .............................. 98/11854

(51) Int. Cl.[7] .............................. F15B 15/14
(52) U.S. Cl. .................. 173/213; 173/11; 173/19; 173/106; 173/218
(58) Field of Search .............. 173/11, 19, 106, 173/104, 213, 218, 222, 93.5

(56) References Cited

U.S. PATENT DOCUMENTS

| 3,279,561 A | | 10/1966 | Flanagan | |
| 4,355,691 A | * | 10/1982 | Karru et al. | 173/106 |
| 5,022,800 A | * | 6/1991 | Vindez | 173/19 |
| 5,311,797 A | * | 5/1994 | Ruessmann et al. | 173/218 |
| 5,489,018 A | | 2/1996 | Foster | |
| 5,782,158 A | * | 7/1998 | Rothering | 173/11 |
| 6,068,068 A | * | 5/2000 | Turoff | 173/218 |

FOREIGN PATENT DOCUMENTS

| CH | 270727 | 12/1950 |
| GB | 2103532 A | 2/1983 |
| ZA | 924302 | 12/1992 |
| ZA | 967417 | 2/1996 |

* cited by examiner

Primary Examiner—Scott A. Smith
(74) Attorney, Agent, or Firm—Timothy J. Keefer; Wildman, Harrold, Allen & Dixon LLP

(57) ABSTRACT

The invention concerns an hydraulically powered mechanism of the kind having a piston assembly which is arranged to be driven by hydraulic fluid acting on it in a working zone and an item of equipment which is to be driven by the piston assembly. The piston assembly presents a face which acts at an interface against a complemental face on the item of equipment. A fluid passage is provided to supply hydraulic fluid from the working zone to the interface for lubrication purposes. In a specific application of the invention it may be used in the rotary indexing mechanism of an hydraulically powered, typically a water-powered, rockdrill.

11 Claims, 5 Drawing Sheets

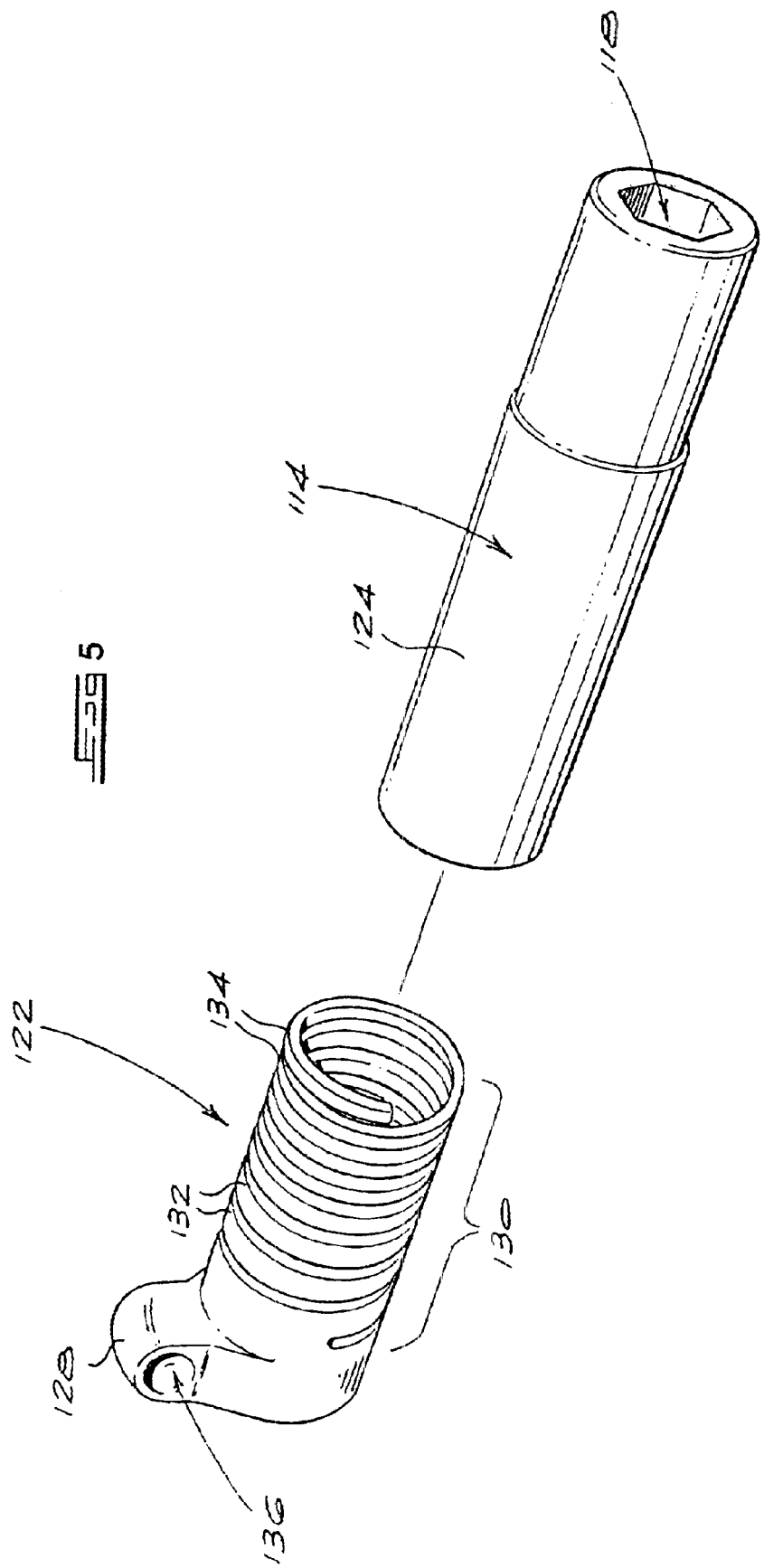

HYDRAULIC ACTUATOR

BACKGROUND TO THE INVENTION

THIS invention relates to hydraulically powered mechanisms.

The specifications of South African patents 92/4302 (Trade Firm 57 (Pty) Limited) and 96/7417 (White Manufacturing (Pty) Limited), the contents of both of which are incorporated herein by reference, describe hydraulically powered rotary indexing mechanisms for rotationally indexing the drill steel of a water-powered rockdrill. In each case differential hydraulic forces acting on opposed piston assemblies are used to achieve rotary oscillation of a rotor which transmits indexed rotary motion to the drill steel via a one-way clutch and chuck in which the drill steel is engaged.

The piston assembly in each case includes a strut or plunger which has a spherically shaped end seating in a complemental socket in a radially projecting lug or ear on the rotor. A problem inherent in each of these known mechanisms is the fact that the spherical interface between the plunger or strut and the rotor socket is an area of high wear.

SUMMARY OF THE INVENTION

According to one aspect of the invention there is provided an hydraulically powered mechanism comprising a piston assembly arranged to be driven by hydraulic fluid acting on it in a working zone, an item of equipment which is to be driven by the piston assembly, the piston assembly presenting a face which acts at an interface against a complemental face on the item of equipment, and a fluid supply passage for supplying hydraulic fluid from the working zone to the interface.

The piston assembly may include a piston and a strut which acts between the piston and the item of equipment with a portion of the passage extending through the strut to the interface. The interface may be a spherically curved interface between a spherically curved end of the strut and a spherically curved socket in the item of equipment, and the spherically curved end of the strut can be formed with a flat. The piston itself may be cup-shaped to receive an end of the strut remote from the interface, a portion of the passage extending through the base of the piston, from the working zone, to communicate with that portion of the passage extending through the strut.

There may be piston assemblies acting at spaced apart interfaces on the item of equipment and a port extending through the item of equipment to provide hydraulic communication between the interfaces. This would typically be the case where the mechanism forms part of a rotary indexing mechanism of an hydraulically powered rockdrill which serves to rotate a drill steel with indexed rotation. In this case, the item of equipment will be a rotor with the complemental face provided by a radial lug of the rotor.

In an hydraulically powered rockdrill, another aspect of the invention provides a rotary indexing mechanism for rotationally indexing a drill steel attached to the rockdrill, the mechanism comprising:

a rotor, opposed piston assemblies arranged to be driven by hydraulic fluid acting on them, the piston assemblies presenting faces which act at respective interfaces against complemental faces on the rotor thereby to drive the rotor in rotary oscillation.

means to convert rotary oscillation of the rotor into indexed rotation of the drill steel, and one or more fluid supply passages for supplying hydraulic fluid to the interfaces.

Typically in this application the piston assemblies are arranged to be driven by hydraulic fluid acting on them in respective working zones, the mechanism comprising one or more fluid supply passages for supplying hydraulic fluid to the interfaces from at least one of the working zones. Typically also, each interface is a spherically curved interface between a spherically curved end of a strut and a spherically curved socket in the rotor lug. The spherically curved end of each strut may be formed with a flat and there may be a port extending through the lug to provide hydraulic communication between the interfaces, the flats serving to ensure that such communication is maintained even if the struts rotate somewhat relative to the lug.

BRIEF DESCRIPTION OF THE DRAWINGS

The invention will now be described in more detail, by way of example only, with reference to the accompanying drawings in which.

Figure 3:
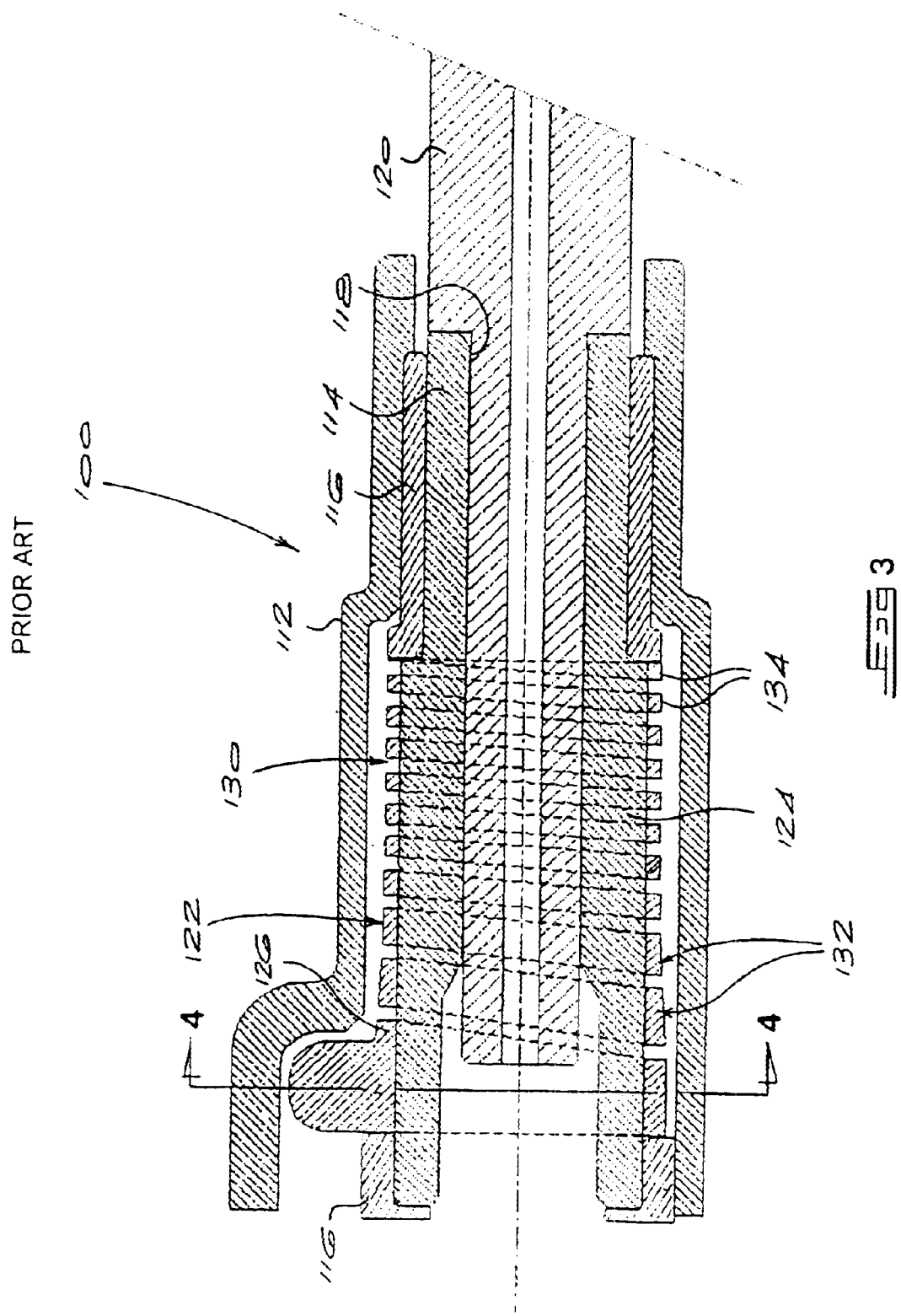
Figure 4:
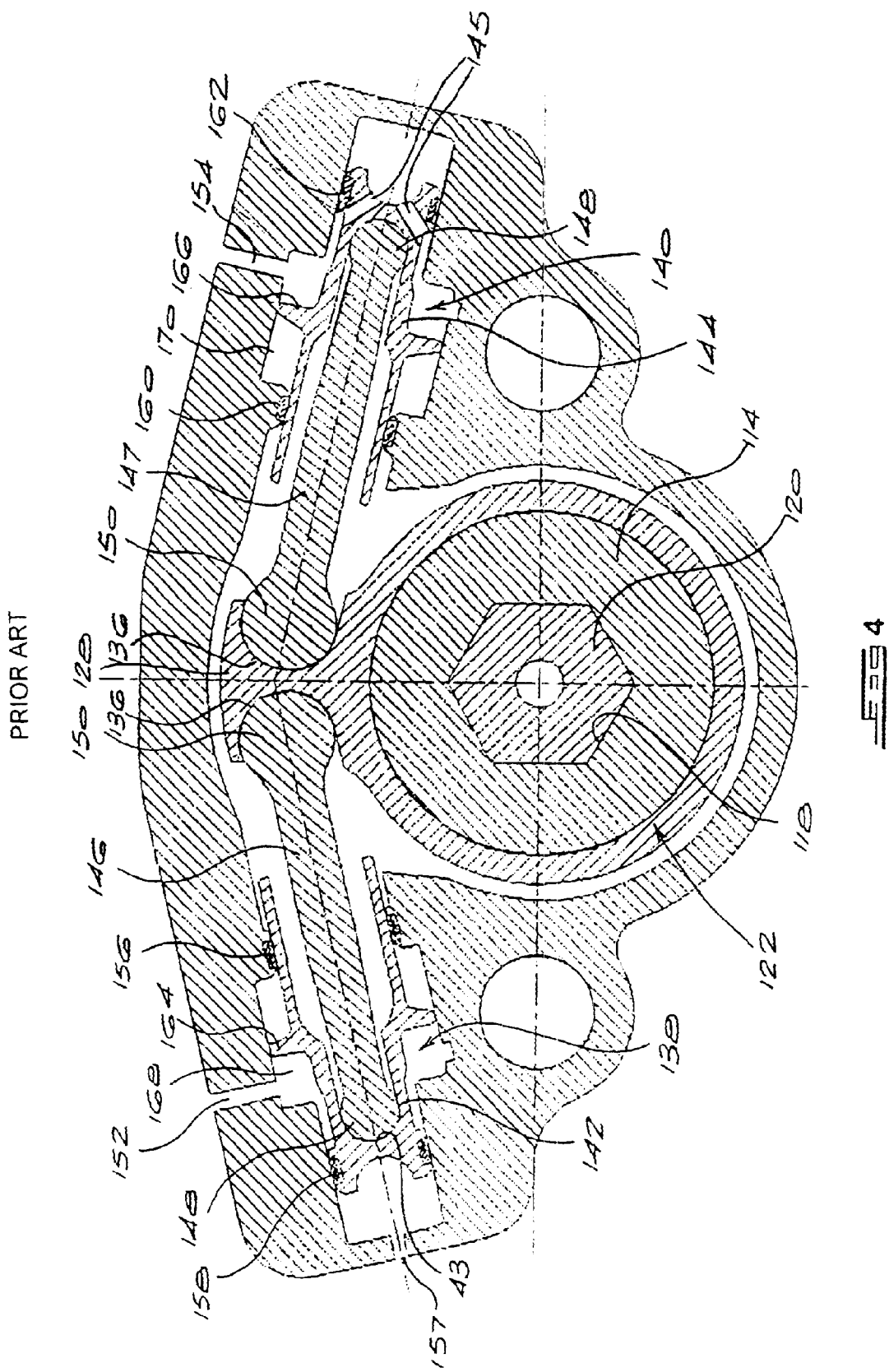

The following drawings show a prior art rotary indexing mechanism as described in the specification of South African patent 96/7417:

FIG. 3 shows a longitudinal cross-sectional view of the fronthead of a rock drill and illustrates the rotary indexing mechanism;

FIG. 4 shows a cross-section at the line 2—2 in FIG. 3; and

FIG. 5 shows an exploded perspective view of the rotor and chuck of the indexing mechanism.

DETAILED DESCRIPTION OF THE DRAWINGS

The prior art rotary indexing mechanism depicted in FIGS. 3, 4 and 5 will firstly be described.

In FIG. 3, the fronthead of a rock drill is indicated by the reference numeral 100. The fronthead includes a casing 112 and a chuck 114 which is supported in the casing by bearings 116 which allow the chuck to rotate freely relative to the casing. As also illustrated in FIGS. 4 and 5, the chuck is formed with a hexagonal central:.aperture 118 which in use receives the rear end of a hexagonal cross-section drill steel 120.

A rotor structure having a rotor 122 is mounted coaxially about an enlarged portion 124 of the chuck 114. In this embodiment, the rotor is of one-piece construction and has a ring portion 126 carrying an upstanding lug 128 and a wrap spring portion 130. As will be particularly clear form FIG. 5, the wrap spring portion 130 extends integrally and coaxially from the ring portion 126. In practice, the ring, lug and wrap spring portions are machined from a single length of steel stock.

The inside diameter of the rotor is constant in the ring portion 126 but tapers down, in a direction away from the ring portion, in the wrap spring portion 130. In addition, it will be noted that the axial dimensions of the turns of the wrap spring portion, and the pitch of the turns decrease incrementally with increasing distance from the ring portion.

The enlarged portion 124 of the chuck has a constant diameter throughout. The internal taper of the wrap spring portion is chosen such that the ring portion and the initial turns of the wrap spring portion, such as those marked 132 and which are closest to the ring portion, make a small clearance on the chuck while the later turns of the wrap spring portion, such as those marked 134 and which are furthest from the ring portion, are slightly smaller in diameter, when relaxed, than the chuck. With this arrangement, there is slight outward deformation of the turns 134 when the rotor is mounted on the chuck, so that the turns 134 already grip the chuck surface to some extent.

The taper described above is extremely small and is not visible in the view of FIG. 3.

The lug 128 is formed with opposing, part-spherical sockets 136. The casing 112 is formed with cylinders 138 and 140 in which respective hollow pistons 142 and 144 are reciprocable. The hollows in the pistons have part-spherical bases 143 and accommodate struts 146 and 147 each of which has part-spherical outer and inner ends 148 and 150 respectively. The ends 148 seat complementally in the bases 143 of the hollows of the pistons and the ends 150 seat complementally in the sockets 136.

Ports 152 and 154 lead into the cylinder 138 and 140 respectively. The piston 142 is sealed with respect to the cylinder 138 by seals 156 and 158. A hole 157 is formed in the casing 112 to allow any hydraulic fluid leaking past the seal 158 to exhaust to atmosphere.

The piston 144 is sealed with respect to the cylinder 140 by a seal 160 and carries a sliding bearing 162. Angled holes 145 are formed in the piston 144 as illustrated.

The pistons 142 and 144 have stepped outer surfaces as will be apparent from FIG. 4. In addition, the pistons have external flanges 164 and 166 which make a small clearance relative to sections 168 and 170 of the cylinders 138 and 140. The geometry is such that the piston 144-presents a larger cross-sectional area to the fluid in the cylinder 140 than the piston 142 presents to fluid in the cylinder 138.

The port 152 is connected to a source of hydraulic fluid, typically mine grade water, at steady pressure, while the port 154 is connected to a source of similar hydraulic fluid at fluctuating pressure. In practice, the port 152 is connected to the source which supplies pressurised water for the percussive action of the rock drill while the port 154 is connected to the working chamber of the rock drill percussion system, and so receives water alternatively at supply pressure and a low exhaust pressure.

The operation of the mechanism illustrated in FIGS. 3, 4 and 5 of the drawings will now be described.

The smaller piston 142 is supplied continuously with high pressure fluid and thus is subjected throughout to a hydraulically generated force which urges it to the right in FIG. 4. When the cylinder 140 is supplied with high pressure fluid the other, larger piston 144 is subjected to a hydraulically generated force which urges it to the left in FIG. 4.

The force acting on the piston 144 is larger in these circumstances than the force acting on the piston 142. The hydraulic forces on the pistons are transmitted to the lug 128 by the struts 146 and 147, with the resultant rotational force driving the rotor 122 in anticlockwise direction as seen in FIG. 4.

When the controlling rock drill cycle switches over the cylinder 140 is supplied with hydraulic fluid at a low, exhaust pressure. There is therefore a substantial reduction in hydraulic pressure acting on the piston 144, and hence a substantial reduction in the force which urges this piston to the left in FIG. 4. The piston 142 is however still supplied with the same pressure and is accordingly urged to the right with the same force as before. In this situation, the force acting on the piston 142 is greater than the force acting on the piston 144 and the resultant force drives the rotor 122 in a clockwise direction in FIG. 4.

Therefore as the rock drill hydraulic system cycles the rotor 122 is oscillated alternately in a clockwise and anticlockwise direction. When the rotor rotates in the anticlockwise direction, as viewed in FIG. 4, the turns or coils of the wrap spring portion 130 are "wound up" with the result that they bind onto and grip the chuck 114 in a strong frictional engagement. Thus oh this cycle, rotary motion is transmitted to the chuck, causing the chuck and the drill steel to rotate. The initial binding of the wrap spring portion onto the chuck is enhanced by the existing engagement resulting from the internal taper of the wrap spring portion, as described above.

When the rotor 122 is rotated in the clockwise direction the coils or turns of the wrap spring portion tend to "unwind" with the result that the wrap spring portion releases the chuck, so that no rotary motion is transmitted from the rotor to the chuck and drill steel. Thus as the rotor oscillates in accordance with the controlling rock drill cycle, the chuck is rotated incrementally, i.e. indexed in an anticlockwise direction as viewed in FIG. 4.

The alternate gripping and releasing of the chuck is aided by the inertia of the spiral wrap spring portion. As the rotor accelerates in the anticlockwise direction the inertia of the coils or turns of the wrap spring also tend to "wind up" the spiral, whereas on the opposite stroke, the inertial effects tend to "unwind" the spiral.

The movement of the piston 142 and 144 is generally tangential to the chuck, with the rotor driving forces transmitted by the struts 146 and 147. The spherical seats at the ends of the struts allow these components to assume the correct orientations throughout their movement to transmit the necessary driving forces despite the fact that the pistons 140 and 142 undergo straight line motion in their respective cylinders. Thus an advantage of the use of spherical-ended struts as illustrated is the fact that wear of the chuck bearings 116 can be accommodated irrespective of direction.

The exact position at which the indexing and reset strokes begin and end is not fixed relative to any given point on the drill casing. This is because the rotor oscillates as the drill cycle switches and not at any fixed point in its travel. At the same time, the load resisting the driving torque varies greatly from a condition in which the drill steel is jammed in a rock mass which is being drilled to a condition in which the chuck is indexed freely with no drill steel in position. As the external loads on the indexing mechanism vary the reciprocating pistons 140 and 142 may migrate towards one or other end of their associated cylinders, with the danger that they may impact against those ends.

In order to reduce piston speed and the severity of impacts between the pistons and the ends of the cylinders, hydraulic dashpots are provided by the limited clearance between the flanges 164 and 166 and the section 168 and 170 of the cylinders. The expulsion of hydraulic fluid through the small annular gaps between the flanges and the cylinders set up a back-pressure which acts on the flanges and retards the motion of the pistons, thereby limiting their maximum speed. Thus although the pistons may still impact on the ends of the cylinders, this is at a reduced speed less likely to cause serious damage.

Although in the embodiment described above, one piston is supplied with hydraulic fluid at constant supply pressure and the other with hydraulic fluid alternately at supply and exhaust pressure, it would also be possible for both pistons to be supplied alternately with fluid at supply pressure and at exhaust pressure. The differential piston areas would still ensure that the desired oscillatory motion of the rotor is obtained.

It should also be noted that this mechanism is not restricted to the use of two opposed pistons as described above. There could, for instance, be two pairs of pistons or a single piston only working against a sprung plunger or as a double-acting piston. In the latter case, the piston would of course have to act in tension as well as compression and this would require the ends of the strut to be seated in an appropriate manner to apply both tension and compression.

In the mechanism described above, the ring portion and wrap spring portion are formed in one piece. In other mechanisms it is possible for the wrap spring portion to be formed as a separate component which is attached to the ring portion so as to rotate with the ring portion. This could, for instance, be achieved with a wrap spring portion having its end located inside the ring portion and made rotationally fast with the ring portion by means of a transverse pin or like which extends from one component and lodges in an opening in the other component.

The present invention will now be described with reference to FIG. 1 and FIG. 2 of the drawings.

Figure 1:
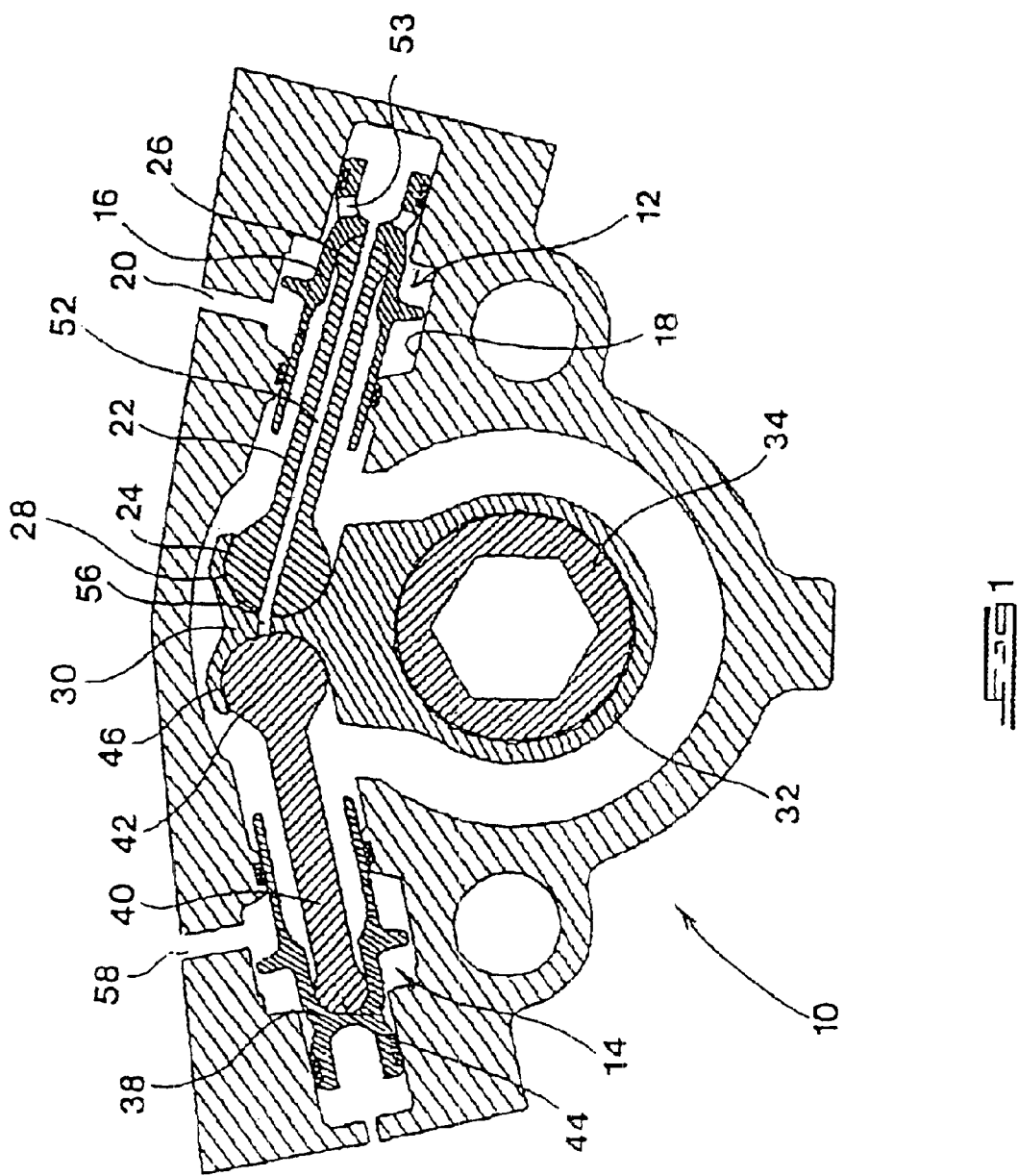
FIG. 1 shows a cross-sectional view of a mechanism according to the invention.

FIG. 1 shows a rotary indexing mechanism 10 of the kind described in the specification of South African patent 96/7417. The rotary indexing function of the illustrated mechanism 10 is exactly the same as described in this patent specification reproduced above.

The piston assemblies of the mechanism 10 are indicated by the numerals 12 and 14 respectively. The piston assembly 12, which can be referred to as the index piston assembly, includes a hollow, cup-shaped piston 16 of relatively large cross-sectional area in a cylinder 18 supplied with fluctuating hydraulic pressure through a port 20 and a strut 22 having front and rear spherical ends 24 and 26 respectively. The rear spherical end 26 seats complementally in the piston 16 while the front spherical end 24 seats in a complementally spherical socket 28 in a radial lug 30 on a rotor 32 which, via a non-illustrated clutch, acts on a drill steel chuck 34. The piston assembly 14, which can be referred to as the reset piston assembly, is similarly configured with a piston 38 of relatively small cross sectional area and strut 40 with front and rear spherical ends 42 and 44. The front spherical end 42 seats complementally in a spherical socket 46 in the opposite side of the lug 30.

Figure 2:
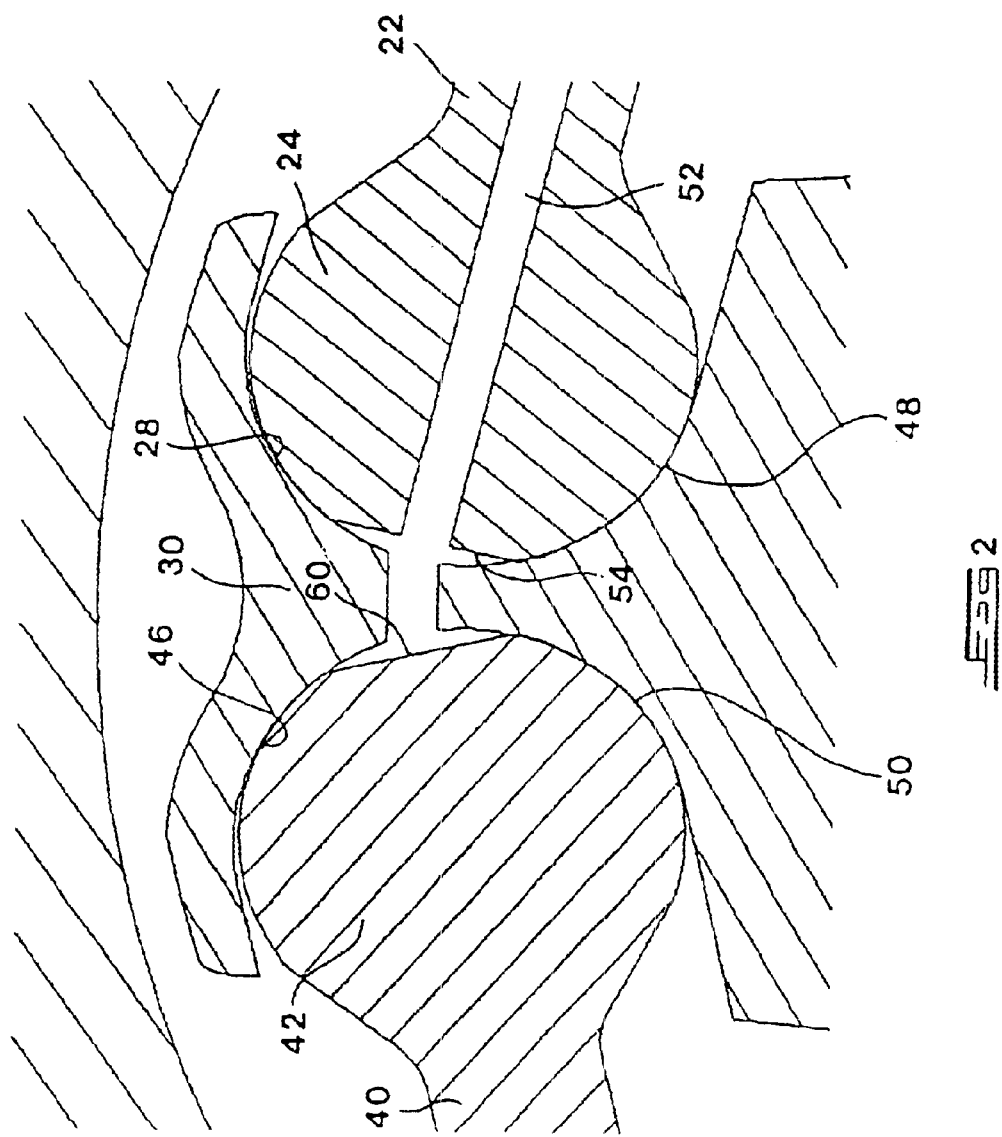
FIG. 2 shows a detailed view of the spherical interfaces.

Referring to FIG. 2, the spherical interfaces between the front spherical ends 24 and 42 and the associated sockets 28 and 46 are designated with the numerals 48 and 50 respectively.

A feature of the mechanism 10 which is not described in the specification of patent 96/7417, and which is the subject matter of the present invention, is a passage 52 which extends through the piston assembly 12 to place the port 20 in hydraulic communication with the spherical interface 48. It will be noted that the passage extends through ports 53 in the base of the piston 16 and that the remainder of the passage extends axially through the strut 22 to the front spherical face at the end 24.

In operation of the mechanism 10 pressurised hydraulic fluid supplied to the cylinder 18 through the port 20 can flow through the passage 52 to the interface 48. At the interface, the hydraulic fluid, i.e. water in the case of a water-powered rockdrill, provides a wear-reducing wetting and lubricating action between the mating spherical surfaces due to weeping and slight leakage as the mechanism oscillates.

Referring again to FIG. 2, it will be seen that the spherical surface at the front end 24 of the strut 22 is formed with a flat 54. The area of the flat is selected to ensure that as the front end 24 rotates slightly relative to the socket 28 during reciprocation of the piston 16 and strut 22, there is always communication between the passage 52 and the interface 48. Although not visible in FIG. 1 a similar flat is provided on the spherical surface at the rear end 26 of the strut 22 to ensure that there is always hydraulic communication between the respective portions of the passage 52 which extend through the strut 22 and the piston 16.

A passage corresponding to the passage 52 could be provided in the piston assembly 14 in order to supply pressurised hydraulic fluid to the spherical interface 50. This would require fluid communication to be provided between the supply port 58 and the interior of the cylinder behind the piston 38.

In view of this and furthermore in view of the difficulty and cost of forming a small diameter bore longitudinally in the strut, it is preferred merely to provide a port 56 which extends through the lug 30 to place the interfaces 48 and 50 in hydraulic communication with one another and hence to provide the desired wetting and lubricating action at the interface 50.

From FIG. 2 it will be seen that the spherical surface at the front end 42 of the strut 40 has a flat 60 similar to, and for the same purpose as, the flat 54. A similar flat is provided at the rear end of the strut 40 as well, for the purpose described above.

In practice, provided that the areas of the various flats is smaller than the working areas of the associated pistons, the pressurised hydraulic fluid will not be able to urge the pistons, struts and sockets apart from one another.

It will be understood that similar provision for wetting and lubrication of the spherical interfaces could also be made in the case of a rotary indexing mechanism of the kind described in the specification of South African patent 93/4302. In fact, in this case, the formation of the interface supply 52 would be even simpler in that, in the absence of the cup-shaped pistons, there would be a need for a single bore only through the plunger.

The invention envisages that the supply of pressurised hydraulic fluid to the interfaces 48 and 50 could also provide a means for hydraulically powering a clutch for the rotary indexing mechanism. There could, for instance, be further porting in the rotor 32 to lead hydraulic fluid from the interfaces 48 and 50 to a suitable hydraulic clutch (not illustrated) to ensure that rotary motion is transmitted from the oscillating rotor to the drill steel chuck in one direction only.

In the case of the illustrated embodiment, it will be understood that the supply of hydraulic fluid to the interface between the rear ends of the struts and the piston sockets will also serve a wetting, lubricating and hence wear-reducing function.

It will also be understood that as a result of the presence of the flats 54, 60 in the relevant faces, those faces are not perfectly spherical. The term "spherical" is nevertheless used herein for convenience.

Although the invention has been described with specific reference to the rotary indexing mechanism of a rockdrill it will be understood that the principles involved are equally applicable to other hydraulically powered mechanisms in which hydraulic lubrication is desirable at working interfaces where piston assemblies act against items of equipment which are to be driven by the piston asemblies.

What is claimed is:

1. A hydraulically powered mechanism comprising:

an item of equipment;

a piston assembly arranged to be driven by hydraulic fluid acting on the piston assembly in a working zone, the piston assembly presenting a face which acts at an interface against a complemental face on the item of equipment thereby to drive the item of equipment, the piston assembly including a piston and a strut, the piston being cup-shaped to receive an end of the strut remote from the interface and the strut acting between the piston and the item of equipment; and a fluid supply passage for supplying hydraulic fluid from the working zone to the interface, a portion of the passage extending through the strut to the interface and another portion of the passage extending from the working zone, through the base of the piston, to communicate with the portion of the passage extending through the strut.

2. A hydraulically powered mechanism according to claim 1 wherein the interface is a spherically curved interface between a spherically curved end of the strut and a spherically curved socket in the item of equipment.

3. A hydraulically powered mechanism according to claim 2 wherein the spherically curved end of the strut is formed with a flat.

4. A hydraulically powered mechanism comprising:

an item of equipment;

piston assemblies arranged to be driven by fluid acting on the piston assemblies in working zones, the piston assemblies presenting faces which act at spaced apart interfaces against complemental faces on the item of equipment thereby to drive the item of equipment;

a fluid supply passage for supplying hydraulic fluid from a working zone to an interface; and a port extending through the item of equipment to provide hydraulic communication between the interfaces.

5. A hydraulic mechanism according to claim 4 wherein the hydraulic mechanism forms part of a rotary indexing mechanism of an hydraulically powered rockdrill which serves to rotate a drill steel with indexed rotation.

6. A hydraulic mechanism according to claim 5 wherein the item of equipment is a rotor and the complemental faces are provided by a radial lug of the rotor.

7. In a hydraulically powered rockdrill, a rotary indexing mechanism for rotationally indexing a drill steel attached to the rockdrill, the mechanism comprising:

a rotor, opposed piston assemblies arranged to be driven by hydraulic fluid acting on the piston assemblies in respective working zones, the piston assemblies presenting faces which act at respective interfaces against complemental faces on the rotor thereby to drive the rotor in rotary oscillation, means to convert rotary oscillation of the rotor into indexed rotation of the drill steel, and one or more fluid supply passages for supplying hydraulic fluid to the interfaces from at least one of the working zones.

8. A rotary indexing mechanism according to claim 7 wherein each piston assembly includes a piston and a strut which acts between the piston and a lug on the rotor and wherein a portion of a fluid supply passage extends through a strut to an associated interface.

9. A rotary indexing mechanism according to claim 8 wherein each interface is a spherically curved interface between a spherically curved end of a strut and a spherically curved socket in the lug.

10. A rotary indexing mechanism according to claim 9 wherein the spherically curved end of each strut is formed with a flat.

11. A rotary indexing mechanism according to claim 7 comprising a port extending through the lug to provide hydraulic communication.

* * * * *